United States Patent

Lin

(10) Patent No.: US 8,851,764 B2
(45) Date of Patent: Oct. 7, 2014

(54) ELECTRONIC DEVICE WITH OPTICAL UNIVERSAL SERIAL BUS CONNECTOR

(75) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 104 days.

(21) Appl. No.: 13/473,777

(22) Filed: May 17, 2012

(65) Prior Publication Data

US 2013/0156380 A1    Jun. 20, 2013

(30) Foreign Application Priority Data

Dec. 19, 2011  (TW) .............................. 100146993 A

(51) Int. Cl.
    *G02B 6/38* (2006.01)
(52) U.S. Cl.
    CPC .................................. *G02B 6/3817* (2013.01)
    USPC .......................................................... 385/75
(58) Field of Classification Search
    CPC .................................................... G02B 6/3817
    USPC .......................................................... 385/75
    See application file for complete search history.

(56) References Cited

U.S. PATENT DOCUMENTS

| 8,256,972 | B2 * | 9/2012 | Wu ................................. 385/93 |
| 8,328,434 | B2 * | 12/2012 | Wang et al. ..................... 385/89 |
| 8,398,314 | B2 * | 3/2013 | Ko et al. ......................... 385/93 |
| 2010/0303421 | A1 * | 12/2010 | He et al. ......................... 385/75 |
| 2010/0322566 | A1 * | 12/2010 | Zheng et al. ................... 385/74 |
| 2011/0085766 | A1 * | 4/2011 | Liao et al. ...................... 385/71 |
| 2011/0176778 | A1 * | 7/2011 | Little et al. .................... 385/76 |
| 2011/0262076 | A1 * | 10/2011 | Hall et al. ....................... 385/78 |
| 2012/0057867 | A1 * | 3/2012 | Lin et al. ........................ 398/43 |
| 2012/0063727 | A1 * | 3/2012 | Wu ................................. 385/88 |
| 2012/0213482 | A1 * | 8/2012 | Su et al. ......................... 385/93 |

* cited by examiner

*Primary Examiner* — Charlie Peng
(74) *Attorney, Agent, or Firm* — Novak Druce Connolly Bove + Quigg LLP

(57) ABSTRACT

An electronic device includes a main body, and an optical USB connector mounted on the main body. The optical USB connector includes a hollow housing mounted on the main body, a mounting portion fixed within the housing, an electrical connecting portion, and an optical connecting portion mounted on the mounting portion. The electrical connecting portion is for transmitting electrical signals. The optical connecting portion is for transmitting optical signals. The optical connecting portion is surrounding the electrical connecting portion.

14 Claims, 2 Drawing Sheets

ELECTRONIC DEVICE WITH OPTICAL UNIVERSAL SERIAL BUS CONNECTOR

BACKGROUND

1. Technical Field

The present disclosure relates generally to electronic devices with universal serial bus connectors (USB connectors), especially to an electronic device with an optical USB connector.

2. Description of Related Art

Universal serial bus connectors for electronic devices are designed for connecting peripheral devices (mouse, keyboard, microphone, recorder, for example) or other electronic devices (MP3, camera, tablet computer, for example), for exchanging data. Some peripheral devices occupy a wide bandwidth when exchanging data, such as digital disk recorder for example. Some peripheral devices occupy a narrow bandwidth when exchanging data, such as mouse, keyboard for example. Following the developing of the technology, more and more electronic devices need wide bandwidths for high-speed exchange of data. However, the USB connectors transmitting electrical signals restrict the speed of exchanging data, thus the USB connectors cannot satisfy the needs for the electronic devices.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
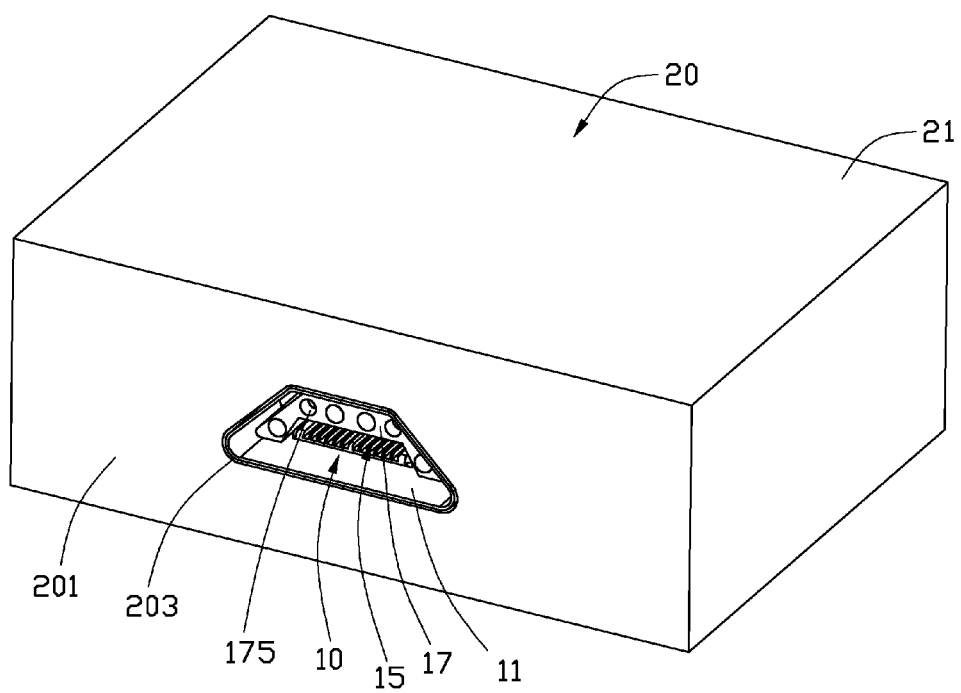
FIG. 1 is an isometric view of one embodiment of an optical universal serial bus connector.

FIG. 1, shows one embodiment of an electronic device 20 including a main body 21 and an optical USB connector 10 mounted on the main body 21. The optical USB connector 10 provides a data inputting port for the electronic device 20 to communicate with another electronic device (not shown) having an optical USB connector.

The main body 21 includes a sidewall 201, for mounting the optical USB connector 10. The sidewall 201 defines a receiving hole 203, for receiving the optical USB connector 10. In the illustrated embodiment, a section of the receiving hole 203 is substantially trapeziform, and four sidewalls surrounding the receiving hole 203 smoothly connect end to end.

Figure 2:
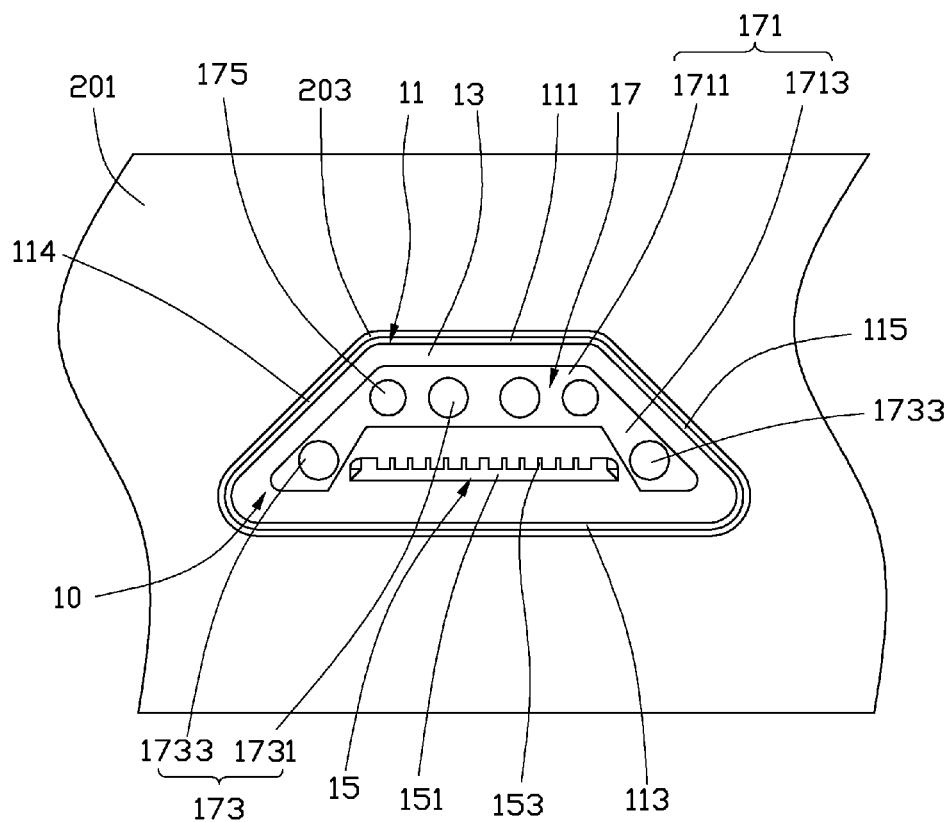
FIG. 2 is a partial, enlarged front view of the optical USB connector shown in FIG. 1.

FIG. 2 shows the optical USB connector 10 including a housing 11, a mounting portion 13, an electrically connecting portion 15, and an optically connecting portion 17. The housing 11 is received in the receiving hole 203 of the main body 21. The mounting portion 13 is fixed within the housing 11. The electrically connecting portion 15 and the optically connecting portion 17 are mounted on the mounting portion 13, and the electrically connecting portion 15 and the optically connecting portion 17 are received in the housing 11.

The housing 11 is hollow and substantial in a shape of trapezoid. The housing 11 is inserted into the receiving hole 203 of the main body 21, for receiving the mounting portion 13, the electrical connecting portion 15, and the optical connecting portion 17. The housing 11 includes a first sidewall 111, a second sidewall 113, a third sidewall 114 and a fourth sidewall 115. The first sidewall 111, the second sidewall 113, the third sidewall 114, and the fourth sidewall 115 are connected end to end, to cooperatively define the shape of trapezoid of the housing 11. The first sidewall 111 and the second sidewall 113 are bases of the housing 11, and the third sidewall 114 and the fourth sidewall 115 are the legs of the housing 11. The first sidewall 111 is parallel with the second sidewall 113, and the first sidewall 111 is shorter than the second sidewall 113.

The mounting portion 13 is a substantially trapeziform block. The mounting portion 13 is fixed within the housing 11, for mounting the electrical connecting portion 15 and the optical connecting portion 17.

The electrical connecting portion 15 is a substantial bar, for transmitting electrical signals. The electrical connecting portion 15 includes a first base plate 151 and a plurality of electrical connecting strips 153 mounted on a face of the first base plate 151 away from the second sidewall 113. The first base plate 151 is an isolation plate, and is fixed on the mounting portion 13 adjacent to the second sidewall 113, and the first base plate 151 is substantially parallel with the second sidewall 113. The plurality of electrical connecting strips 153 are parallel with each other, for electrically communicating with an optical USB adapter to transmit electrical signals.

The optical connecting portion 17 is mounted on the mounting portion 13, for transmitting optical signals. The optical connecting portion 17 includes a second base plate 171, a lens set 173 and a positioning portion 175 mounted on the second base plate 171. The second base plate 171 is an isolation plate, and is fixed on the mounting portion 13. The second base plate 171 includes a base body 1711 and a pair of bending portions 1713 extending from two opposite ends of the base body 1711 towards the second sidewall 113. In the illustrated embodiment, the base body 1711 is mounted on the mounting portion 13 adjacent to the first sidewall 111, and the base body 1711 is parallel with the first sidewall 111. The bending portions 1713 are mounted on the mounting portion 13 adjacent to the third sidewall 114 and the fourth sidewall 115. One of the bending portions 1713 is parallel with the third sidewall 114, and another one of the bending portions 1713 is parallel with the fourth sidewall 115. The base body 1711 and the bending portions 1713 surround the electrical connecting portion 15.

The lens set 173 is inlayed in a sidewall of the second base plate 171 away from the mounting portion 13. In the illustrated embodiment, the lens set 173 includes a pair of inputting lenses 1731 and a pair of outputting lenses 1733. The inputting lenses 1731 are mounted on the middle of the base body 1711 of the second base plate 171, for receiving optical signals for the electronic device 20. The outputting lenses 1733 are respectively mounted on two ends of the bending portions 1713 away from the base body 1711, for outputting optical signals from the electronic device 20. In other embodiments, the inputting lens 1731 can be one, three, for example. The outputting lens 1733 can be one, three, for example.

The positioning portions 175 are mounted on the second base plate 171, for positioning another optical USB adapter (not shown) to the optical USB connector 10. In the illustrated embodiment, there are two positioning portions 175 mounted at two opposite ends of the base body 1711 of the second base plate 171, and the positioning portions 175 are adjacent to the inputting lenses 1731. The positioning portions 175 are holes. In other embodiments, the positioning portions 175 can be designed as posts, and the number of the positioning portions 175 can be one, three, four, for example. The positioning portions 175 can be replaced by fastening structures for fastening the optical USB to the optical USB connector 10.

The optical USB connector 10 further includes a plurality of wires (not shown), and a plurality of optical fibers (not shown). The wires are inserted in the mounting portion 13, and electrically connected to the electrical connecting strips 153. The optical fibers are inserted in the mounting portion 13 and the second base plate 171, and optical coupling with the lens set 173.

In use, the optical USB connector 10 connects with an optical USB adapter (not shown), for exchanging data between the electronic device 20 and another electronic device (not shown). The wires transmit electrical signals from the electronic device 20 to the electrical connecting strips 153, thereby the electrical connecting strips 153 transmitting the electrical signals to the other electronic device via the optical USB adapter. The optical fibers transmit the optical signals from the electronic device 20 to the outputting lenses 1733, thereby the outputting lenses 1733 output the optical signals to the other electronic device via the optical USB adapter. The inputting lenses 1731 receive optical signals from the other electronic device, and transmit the optical signals to the electronic device 20 via the optical fibers. Thus, the electronic device 20 achieves data exchange with the other electronic device.

Because the lens set 173 is located surround the electrical connecting portion 15, a space between the housing 11 and the electrical connecting portion 15 is being used reasonably, thus the lens set 173 can be designed for increasing the transmitting speed of the optical USB connector 10. The inputting lenses 1731 are mounted on the base body 1711, and the outputting lenses 1733 are mounted on the bending portions 1713, thus avoiding inclining or deviating of the lens set 173, which may happen when setting the lenses 1711, 1713 of the lens set 173 in the base body 1711, thereby decreasing the transmission loss of the optical signals.

It is believed that the present embodiments and their advantages will be understood from the foregoing description, and it will be apparent that various changes may be made thereto without departing from the spirit and scope of the disclosure or sacrificing all of its material advantages.

What is claimed is:
1. An electronic device, comprising:
a main body; and
an optical USB connector mounted on the main body, comprising:
a housing being hollow and mounted on the main body; wherein the housing comprises a first sidewall, a second sidewall, a third sidewall and a fourth sidewall, the first sidewall, the second sidewall, the third sidewall and the fourth sidewall are connected end to end, the housing is in a shape of trapezoid, and the first sidewall is parallel with the second sidewall; the first sidewall and the second sidewall are bases of the housing; the third sidewall and the fourth sidewall are legs of the housing,
a mounting portion fixed within the housing,
an electrical connecting portion mounted on the mounting portion, for transmitting electrical signals, and
an optical connecting portion mounted on the mounting portion, for transmitting optical signals, the optical connecting portion comprising a second base plate and a lens set mounted on the second base plate, the second base plate comprising a base body and a pair of bending portions extending from two opposite ends of the base body towards a same side of the base body; the second base plate partially surrounding the electrical connecting portion.

2. The electronic device of claim 1, wherein the mounting portion is trapeziform, and is accommodated in the housing.

3. The electronic device of claim 1, wherein the electrical connecting portion comprises a first base plate and a plurality of electrical connecting strips formed at a face of the first base plate; the first base plate is mounted on the mounting portion adjacent to the second sidewall of the housing; the electrical connecting strips are mounted on a sidewall of the base plate away from the second sidewall of the housing.

4. The electronic device of claim 3, wherein the pair of bending portions extends towards the second sidewall.

5. The electronic device of claim 4, wherein the lens set comprises at least one inputting lens and at least one outputting lens; the at least one inputting lens is used for receiving optical signals for the electronic device; the at least one outputting lens is used for outputting optical signals from the electronic device.

6. The electronic device of claim 5, wherein the at least one inputting lens is mounted on a middle of base body of the second base plate, the at least one outputting lens is mounted on an end of the bending portion.

7. The electronic device of claim 6, wherein the optical connecting portion further comprises at least one positioning portion at an end of the base body of the second base plate.

8. The electronic device of claim 1, wherein the main body comprises a sidewall, the sidewall defines a receiving hole; the optical USB connector is received in the receiving hole.

9. An optical USB connector, comprising:
a housing being hollow, and comprising a first sidewall, a second sidewall, a third sidewall and a fourth sidewall; the first sidewall, the second sidewall, the third sidewall and the fourth sidewall connected end to end; the housing being in a shape of trapezoid, the first sidewall being parallel with the second sidewall; the first sidewall and the second sidewall being bases of the housing; the third sidewall and the fourth sidewall being legs of the housing,
a mounting portion fixed within the housing,
an electrical connecting portion mounted on the mounting portion, for transmitting electrical signals, and
an optical connecting portion mounted on the mounting portion, for transmitting optical signals, the optical connecting portion comprising a second base plate and a lens set mounted on the second base plate, the second base plate comprising a base body and a pair of bending portions extending from two opposite ends of the base body towards the second sidewall, the second base plate partially surrounding the electrical connecting portion.

10. The optical USB connector of claim 9, wherein the mounting portion is trapeziform, and is accommodated in the housing.

11. The optical USB connector of claim 9, wherein the electrical connecting portion comprises a first base plate, and a plurality of electrical connecting strips formed at a face of the base plate; the first base plate is mounted on the mounting portion adjacent to the second sidewall of the housing; the electrical connecting strips are mounted on a sidewall of the base plate away from the second sidewall of the housing.

12. The optical USB connector of claim 11, wherein the lens set comprises at least one inputting lens and at least one outputting lens; the at least one inputting lens is used for receiving optical signals for the electronic device; the at least one outputting lens is used for outputting optical signals from the electronic device.

13. The optical USB connector of claim 12, wherein the at least one inputting lens is mounted on a middle of base body of the second base plate, the at least one outputting lens is mounted on an end of the bending portion.

14. The optical USB connector of claim 13, wherein the optical connecting portion further comprises at least one positioning portion mounted an end of the base body of the second base plate.

* * * * *